US012749062B2

(12) United States Patent
Yepez

(10) Patent No.: US 12,749,062 B2
(45) Date of Patent: Sep. 29, 2026

(54) DECENTRALIZED SELF-SERVICE CHECKOUTS

(71) Applicant: NCR Voyix Corporation, Atlanta, GA (US)

(72) Inventor: Rafael Yepez, Duluth, GA (US)

(73) Assignee: NCR Voyix Corporation, Atlanta, GA (US)

( * ) Notice: Subject to any disclaimer, the term of this patent is extended or adjusted under 35 U.S.C. 154(b) by 11 days.

(21) Appl. No.: 17/902,400

(22) Filed: Sep. 2, 2022

(65) Prior Publication Data

US 2023/0076008 A1 Mar. 9, 2023

Related U.S. Application Data

(60) Provisional application No. 63/240,599, filed on Sep. 3, 2021.

(51) Int. Cl.
*G06Q 20/20* (2012.01)
*G06K 7/14* (2006.01)
(Continued)

(52) U.S. Cl.
CPC ....... *G06Q 20/3224* (2013.01); *G06K 7/1413* (2013.01); *G06Q 20/047* (2020.05); (Continued)

(58) Field of Classification Search
CPC ............ G06Q 20/3224; G06Q 20/047; G06Q 20/18; G06Q 20/208; G06Q 20/3223; (Continued)

(56) References Cited

U.S. PATENT DOCUMENTS 7,780,081 B1 * 8/2010 Liang ................. G06Q 30/0633 235/383
10,282,720 B1 * 5/2019 Buibas ................... G06Q 20/18
(Continued)

FOREIGN PATENT DOCUMENTS

CA 2687861 A1 * 6/2010 ........... G07G 1/0054
CA 3065615 A1 * 6/2020 ............... G07G 1/14
(Continued)

OTHER PUBLICATIONS

J. . -S. Yih, F. Pinel, Y. . -H. Liu and T. Chieu, "Pervasive computing technologies for retail in-store shopping," ICPS '05. Proceedings. International Conference on Pervasive Services, 2005., Santorini, Greece, 2005, pp. 111-116, (Year: 2005).*
(Continued)

*Primary Examiner* — Ashford S Hayles
(74) *Attorney, Agent, or Firm* — Schwegman Lundberg & Woessner, P.A.

(57) ABSTRACT

A shopper is identified upon entering a store and a shopping session is initiated for the shopper. Locations of the shopper within the store are tracked using wireless signals of a shopper's device. Items are scanned and/or weighed at distributed devices that report the item details to a server. The server correlates the shopper's current location to the reporting device and updates details for the shopping session. This continues until the shopper is ready to exit the store at which time the shopper can leave the store and have the server process payment for the transaction using a registered account. Alternatively, the shopper visits a payment station and provides cash or card to the station. The station reports the payment details and if cash change is due, the server instructs the station to dispense the correct change to the shopper.

12 Claims, 7 Drawing Sheets

100A

100B

(51) Int. Cl.

| | |
|---|---|
| ***G06Q 20/04*** | (2012.01) |
| ***G06Q 20/18*** | (2012.01) |
| ***G06Q 20/32*** | (2012.01) |
| ***G06Q 20/42*** | (2012.01) |
| ***G06Q 30/0601*** | (2023.01) |
| ***G07G 1/01*** | (2006.01) |
| ***G09F 13/04*** | (2006.01) |
| ***G09F 13/22*** | (2006.01) |
| ***H04N 23/56*** | (2023.01) |
| ***H04N 23/90*** | (2023.01) |
| *G06V 20/52* | (2022.01) |
| *G06V 40/10* | (2022.01) |

(52) U.S. Cl.
CPC ........... *G06Q 20/18* (2013.01); *G06Q 20/208* (2013.01); *G06Q 20/3223* (2013.01); *G06Q 20/42* (2013.01); *G06Q 30/0623* (2013.01); *G06Q 30/0639* (2013.01); *G07G 1/01* (2013.01); *G09F 13/0431* (2021.05); *G09F 13/22* (2013.01); *H04N 23/56* (2023.01); *H04N 23/90* (2023.01); *G06V 20/52* (2022.01); *G06V 40/10* (2022.01)

(58) Field of Classification Search
CPC ........... G06Q 30/0623; G06Q 30/0639; G06Q 20/202; G06Q 20/325; G06Q 20/3278; G06Q 20/40155; G06K 7/1413; H04N 23/90; G06V 20/52; G06V 40/10; G07G 1/0036
See application file for complete search history.

(56) References Cited

U.S. PATENT DOCUMENTS 10,430,841 B1* 10/2019 Shah .................. G06Q 30/0281
10,460,572 B2* 10/2019 Brackenridge ........ G06Q 20/10
10,636,024 B2* 4/2020 Scott .................... G07G 1/0072
10,885,336 B1* 1/2021 Davis ................. G06Q 30/0623
11,100,485 B2* 8/2021 Wyper ............. G06K 19/06037
11,244,300 B2* 2/2022 Wang ................... G06Q 20/385
11,847,688 B2* 12/2023 Mirza ..................... G06T 7/246
12,062,013 B1* 8/2024 Zhu ......................... G06F 16/23
2004/0254940 A1* 12/2004 Brush .............. H04N 21/47202 348/E7.071
2006/0131401 A1* 6/2006 Do ......................... G06Q 30/02 235/383
2006/0136285 A1* 6/2006 Alvarez ................. G06Q 10/08 705/7.29
2008/0041937 A1* 2/2008 Vawter ................... G06Q 20/02 235/380
2012/0191817 A1* 7/2012 Sayan ................ G06Q 30/0639 709/219
2012/0316963 A1* 12/2012 Moshfeghi ............. G06Q 20/20 705/14.58
2013/0030931 A1* 1/2013 Moshfeghi ............... H04B 5/73 705/16
2013/0073405 A1* 3/2013 Ariyibi ................ G06Q 20/346 705/26.7
2013/0332273 A1* 12/2013 Gu ........................ G01S 5/0027 701/428
2014/0058946 A1* 2/2014 Paranjape ............ G06Q 20/208 705/44
2014/0214577 A1* 7/2014 Acker, Jr. .............. G01G 19/12 705/23
2014/0263631 A1* 9/2014 Muniz .................. G06Q 20/208 235/383
2015/0006319 A1* 1/2015 Thomas ............. G06Q 30/0633 705/26.8
2015/0025936 A1* 1/2015 Garel ................. G06Q 30/0201 705/7.29
2015/0025969 A1* 1/2015 Schroll ................ G06Q 20/208 705/14.64
2015/0032636 A1* 1/2015 Wedekind ............ G06Q 20/204 705/76
2015/0039458 A1* 2/2015 Reid ...................... A61B 5/117 705/26.1
2015/0127496 A1* 5/2015 Marathe ............... G06Q 10/087 705/28
2015/0154675 A1* 6/2015 Todasco ............. G06Q 30/0631 705/26.7
2015/0186982 A1* 7/2015 Higgins ............. G06Q 30/0639 705/26.8
2015/0242899 A1* 8/2015 Farhi .................. G06Q 30/0261 705/14.58
2015/0269549 A1* 9/2015 Herring ................ G06Q 20/203 705/18
2015/0278829 A1* 10/2015 Lu ......................... H04W 4/029 705/7.29
2015/0348146 A1* 12/2015 Shanmugam ...... G06Q 20/3829 705/27.2
2016/0358145 A1* 12/2016 Montgomery ...... G06F 16/9535
2017/0006434 A1* 1/2017 Howe ................... H04W 4/021
2017/0041744 A1* 2/2017 McKay ................. H04W 4/021
2017/0046707 A1* 2/2017 Krause ............... G06Q 20/4016
2017/0083887 A1* 3/2017 Volta .................... G06Q 20/203
2017/0116589 A1* 4/2017 Krishnaiah .......... G06Q 20/322
2017/0200152 A1* 7/2017 Winkler ............... G06Q 20/321
2017/0206516 A1* 7/2017 Watson ............. G06Q 20/3274
2017/0323376 A1* 11/2017 Glaser ................ G06Q 30/0643
2018/0075427 A1* 3/2018 Greenberger ........ G06Q 20/389
2018/0096566 A1* 4/2018 Blair .................... G06Q 20/209
2018/0158056 A1* 6/2018 Williams ............. G06Q 20/208
2018/0232796 A1* 8/2018 Glaser ..................... G06Q 90/20
2018/0240180 A1* 8/2018 Glaser .................. G07G 1/0081
2018/0260877 A1* 9/2018 Li ...................... G06Q 30/0633
2018/0365755 A1* 12/2018 Bekbolatov ........ G06Q 30/0603
2018/0373928 A1* 12/2018 Glaser ..................... G06V 40/20
2019/0034897 A1* 1/2019 Gao ........................ G06Q 20/18
2019/0073655 A1* 3/2019 Barkan .............. G06K 7/10366
2019/0087810 A1* 3/2019 Dopkeen ............ G06Q 20/3278
2019/0156276 A1* 5/2019 Fisher .................. G06Q 10/087
2019/0236684 A1* 8/2019 Davis ..................... B62B 5/0096
2019/0318395 A1* 10/2019 Shah ................. G06Q 30/0281
2019/0355049 A1* 11/2019 Kulkarni Wadhonkar .................. G06Q 20/12
2020/0019921 A1* 1/2020 Buibas .................. G06T 19/003
2020/0043320 A1* 2/2020 Carey .................. G08B 13/248
2020/0151692 A1* 5/2020 Gao ..................... G06Q 10/087
2020/0250736 A1* 8/2020 Howard ................. G06V 20/10
2020/0265458 A1* 8/2020 Esecson ............. G06Q 30/0238
2020/0279238 A1* 9/2020 Leake .............. G06Q 20/40145
2020/0302417 A1* 9/2020 Wyper ................... G06Q 30/04
2020/0334696 A1* 10/2020 Ansari .................... H04W 4/33
2021/0158430 A1* 5/2021 Buibas ...................... G06N 3/08
2021/0192902 A1* 6/2021 Sasaki .................. G06Q 20/204
2021/0241359 A1* 8/2021 Miyagi .................. G06Q 30/06
2021/0272423 A1* 9/2021 Gao ........................ A47F 9/048
2021/0304169 A1* 9/2021 Helms .................... G06Q 30/04
2021/0319420 A1* 10/2021 Yu .......................... G06V 20/52
2021/0327234 A1* 10/2021 Chandramowle ...... G06Q 30/04
2021/0342588 A1* 11/2021 Davis ................. G06Q 30/0623
2021/0357894 A1* 11/2021 Kubo ................. G06Q 20/3224
2021/0374707 A1* 12/2021 Sartori ................. G06Q 20/204
2022/0374855 A1* 11/2022 Balaoro .................. H04W 4/80

FOREIGN PATENT DOCUMENTS

EP 2413298 A1 * 2/2012 ........... G06Q 20/047
GB 2344671 A * 6/2000 ............. G06Q 30/06
KR 102336264 B1 * 12/2021 ........... G06T 19/006
WO WO-2018076009 A1 * 4/2018 ......... G06Q 30/0639
WO WO-2019245441 A1 * 12/2019 ........... B62B 5/0096

(56) References Cited

FOREIGN PATENT DOCUMENTS

| | | | | | |
|---|---|---|---|---|---|
| WO | WO-2020023795 | A1 * | 1/2020 | ....... | G06F 18/24133 |
| WO | WO-2021176401 | A1 * | 9/2021 | ........... | G06Q 20/085 |

OTHER PUBLICATIONS

Garbato, D. (2019). How Frictionless Shopping Works for Family Express: A new technology ecosystem links critical consumer touchpoints across four business areas. Convenience Store News, 55(5), 39-41. (Year: 2019).*

* cited by examiner

DECENTRALIZED SELF-SERVICE CHECKOUTS

RELATED APPLICATIONS

This application is a non-provisional application that claims the benefit of Provisional Application No. 63/240,599 entitled "Modular, Portable, and Reconfigurable Interactive Displays, Terminals, and Peripherals with Interface and Store-Wide and Customer-Specific Automated Assistance, Managing, and Monitoring," filed on Sep. 3, 2021, the disclosure of which is incorporated in its entirety herein.

BACKGROUND

A typical retail shopping experience proceeds as follows. A customer walks into a store and grabs a basket or a cart; picks items from shelves, freezers, and/or produce displays; and finds a checkout terminal located near the exit, removes each item for scanning or weighing, bags the items, pays for the items, and exits the store.

Even current automated shopping experiences are cumbersome. Typically, an automated shopping experience proceeds as follows. A customer walks into a store and grabs a basket, cart, and/or bags; picks items from shelves, freezers, and/or produce display; scans each item's barcode using the customer's mobile device; places the items in the bags, basket, and/or cart, finds a checkout terminal to weigh any produce requiring weights and/or to pay for restricted items, such as alcohol, tobacco, etc.; pays at a self-checkout terminal of via an application on the customer's mobile device; and exits the store. Further, the customer is required to hold their mobile device in their hand most of the time while shopping, making the handling of items cumbersome.

These two experiences have flaws because they rely upon a centralized checkout area that requires many specialized checkout devices, which shoppers gather and queue around. This can be frustrating for may shoppers, especially those with few items, and is often considered as a "bottleneck" in the retail experience. It also increases risk of contagion by large groups of people standing in close proximity to one another for extended periods of time, which has become more of a concern for individuals due to the COVID19 pandemic.

Frictionless shopping relies on computer vision technology to correctly identify customers and the items that customers pick from a store. This nascent technology frequently misidentifies both the customers and the items picked and the identification response times are currently impractical to implement on any large scale. Thus, at present, this technology is unreliable.

SUMMARY

In various embodiments, methods and a system for decentralized self-service (SS) checkouts are presented. A plurality of scanning devices, weighing devices, wireless beacons, and payment devices are distributed throughout a store and networked to a cloud or server-based tracker. Locations of a shopper are tracked via a shopper's mobile device, the wireless beacons, and/or video cameras to identify when the shopper is at one of the scanning, weighing, or payment devices. The shopper scans or weighs an item at the corresponding distributed device and the item information for the item is reported by the distributed device to a cloud-based transaction manager which maintains a basket of items associated with the shopper. The shopper continues around the store collecting items for the basket and recording the items via the distributed devices. When the shopper is tracked to a payment device, a mobile application of the shopper's mobile device indicates a transaction amount due for the shopper's transaction and the shopper inserts currency and/or a payment card to pay for the transaction. Alternatively, when the shopper has a registered payment method, the shopper simply exits the store after the shopper has collected the shopper's basket of items.

According to an aspect, a method for decentralized SS checkouts is provided. A session is established for a shopper entering a store and locations of the shopper within the store are tracked to distributed devices. Item details for items are correlated with the shopper when reported by the distributed devices during the session based on the locations of the shopper and known locations associated with the distributed devices. The session is ended when payment is confirmed for the items.

DETAILED DESCRIPTION

Figure 1A:
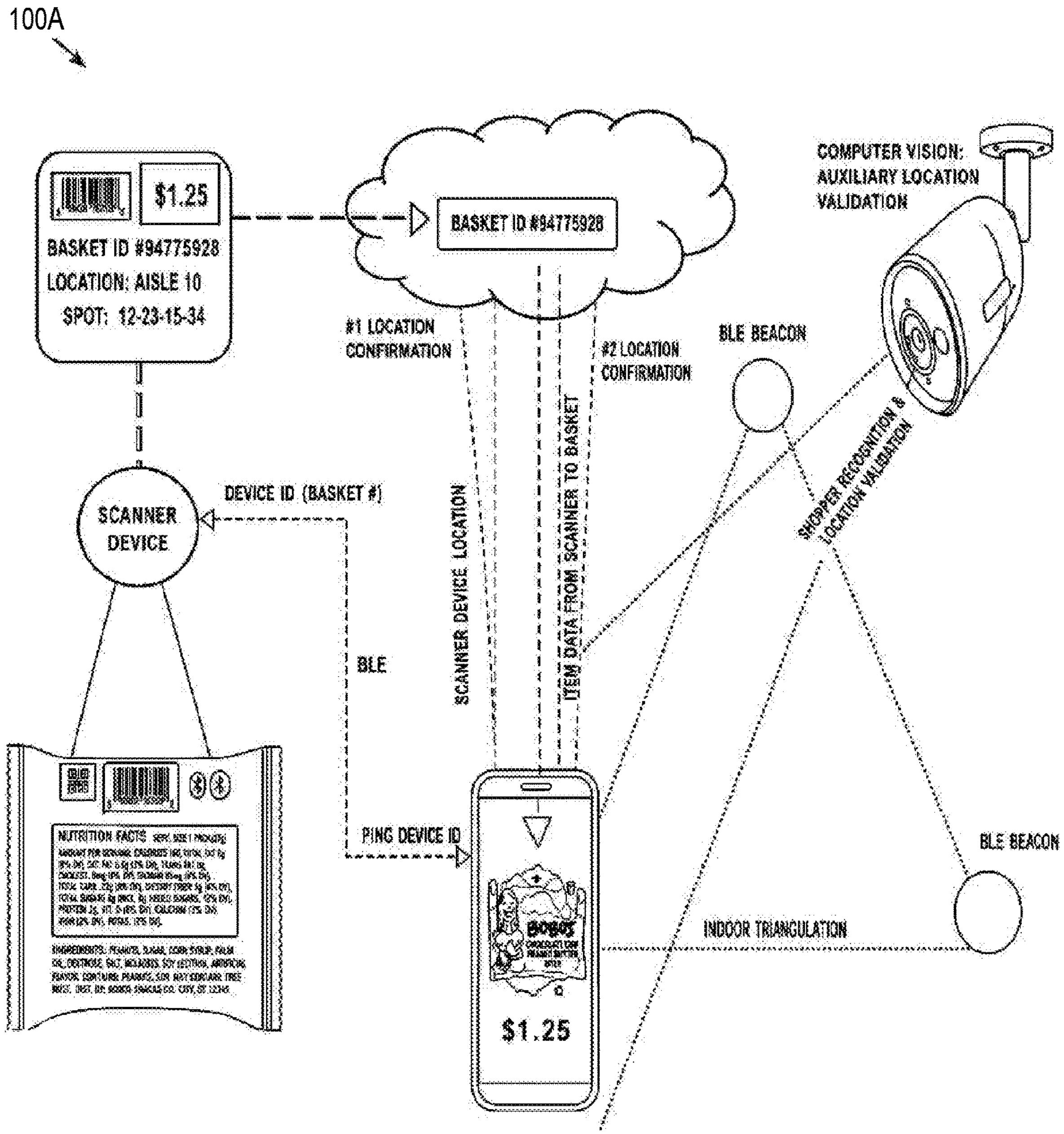
FIG. 1A is a diagram of some example devices and an example operation to record an item with a transaction as a portion of the decentralized SS checkouts, according to an example embodiment.

A shopper's visit to a store is often fraught with inefficiencies and frustrations. Health and safety concerns associated with physical shopping experiences have also increased due to the pandemic. Disclosed herein are technical solutions that alleviate these health and safety concerns and improve the efficiency and shopping experience for the shopper.

As will be demonstrated herein and below, a distributed SS checkout system is provided. The distributed SS checkout system includes a set of distributed devices, wireless beacons, and optionally cameras, that are networked together via a communicative coupling to a network server or a cloud. In example embodiments, while in a store, a shopper is tracked via the wireless transceiver of the shopper's mobile device relative to wireless beacon signals from standalone wireless beacons and/or from wireless transceivers of the distributed devices. Images from cameras may be used to pinpoint/confirm a location of a shopper in relation to a given distributed device.

When the shopper weighs the item or scans an item barcode from the item at the distributed device, the distributed device reports the item code and/or item rate to the server-based or cloud-based transaction manager. The current location of the shopper is matched to the device that reported the item code/weight and the transaction manager adds the item code and item details to a basket of items being maintained for the shopper. Each basket of items is assigned a unique transaction identifier by the transaction manager. When the shopper has a registered payment method with the store, the shopper is free to leave the store at any point in time and the transaction manager will send a transaction receipt to a mobile application of the shopper's mobile device and process the transaction payment using the registered payment method of the shopper.

When the shopper desires to checkout with cash or a payment card, the shopper travels to a payment device within the store, the shopper's transaction details are presented in the mobile application of the shopper's mobile device for review by the shopper and inserts the currency or payment into the payment device. The payment device reports the payment details to the transaction manager and the transaction manager associated it with the shopper's transaction identifier. If cash change is due to the shopper when the shopper paid with cash, the transaction manager instructs the payment device to dispense the appropriate change to the shopper.

It is to be noted that the shopper does not have to be actively operating their mobile device during the shopping as the scanning and weighing are performed on a plurality of distributed devices within the store. However, at any time during the shopping, and optionally before exiting the store, the shopper may view their mobile application and see running details or final totals for their basket of items as the transaction manager keeps the basket of items and corresponding details synchronized with the shopper's mobile application. Additionally, this permits the shopper to shop with both hands without the need to operate their mobile device. This provides a semi or near frictionless experience for the shopper without the processing delays and identification errors associated with an image-based frictionless shopping experience.

Additionally, images from cameras can be used for validation and security. For example, an image can be quickly and efficiently processed to confirm a given shopper is in front of a known distributed device. Images can be processed to identify items picked by the shopper in the store but not scanned or weighed for the transaction. Thus, since image processing is focused on theft and location confirmation and not customer and item identification, the image processing is more efficient and accurate with better responses time than what is associated with image-based frictionless shopping.

FIG. 1A is a diagram 100A of some example devices and an example operation to record an item with a transaction as a portion of the decentralized SS checkouts, according to an example embodiment. Diagram 100A illustrates devices and operations performed for a sample item being recorded in a basket for a shopper.

When the shoppers mobile device is detected within the store such as by the mobile application (app) of the mobile device reporting its location or connecting to Wi-Fi at the store. A network-based transaction manager identifies the shopper based on a mobile device identifier being reported for the shopper and the transaction manager assigns a basket identifier or a transaction identifier to the shopper identifier associated with the shopper. The transaction identifier is pushed to the mobile application of the mobile device and a shopping session for the shopper within the store is established.

It is noted that this can be done in other manners as well for non-registered shoppers. For example, a non-registered shoppers can scan a barcode upon entering the store that downloads the mobile app to the unregistered shopper's mobile device, the unregistered shopper can continue with the shopping session established as an anonymous shopper or may register within the app. For an anonymous shopper, the transaction manager assigns a unique shopper identifier that is unique to the anonymous shopper but does not include any other identifying information for the anonymous shopper other than the anonymous shopper's mobile device identifier, which was used to establish the shopping session.

In another case, a registered shopper's mobile app uses location services authorized by the shopper to report the location of the shopper's mobile device. Here, when the mobile app reports a location that corresponds to the store, the transaction manager assigns a transaction identifier or basket identifier to a shopper identifier and pushes the transaction/basket identifier to the mobile app.

Figure 1B:
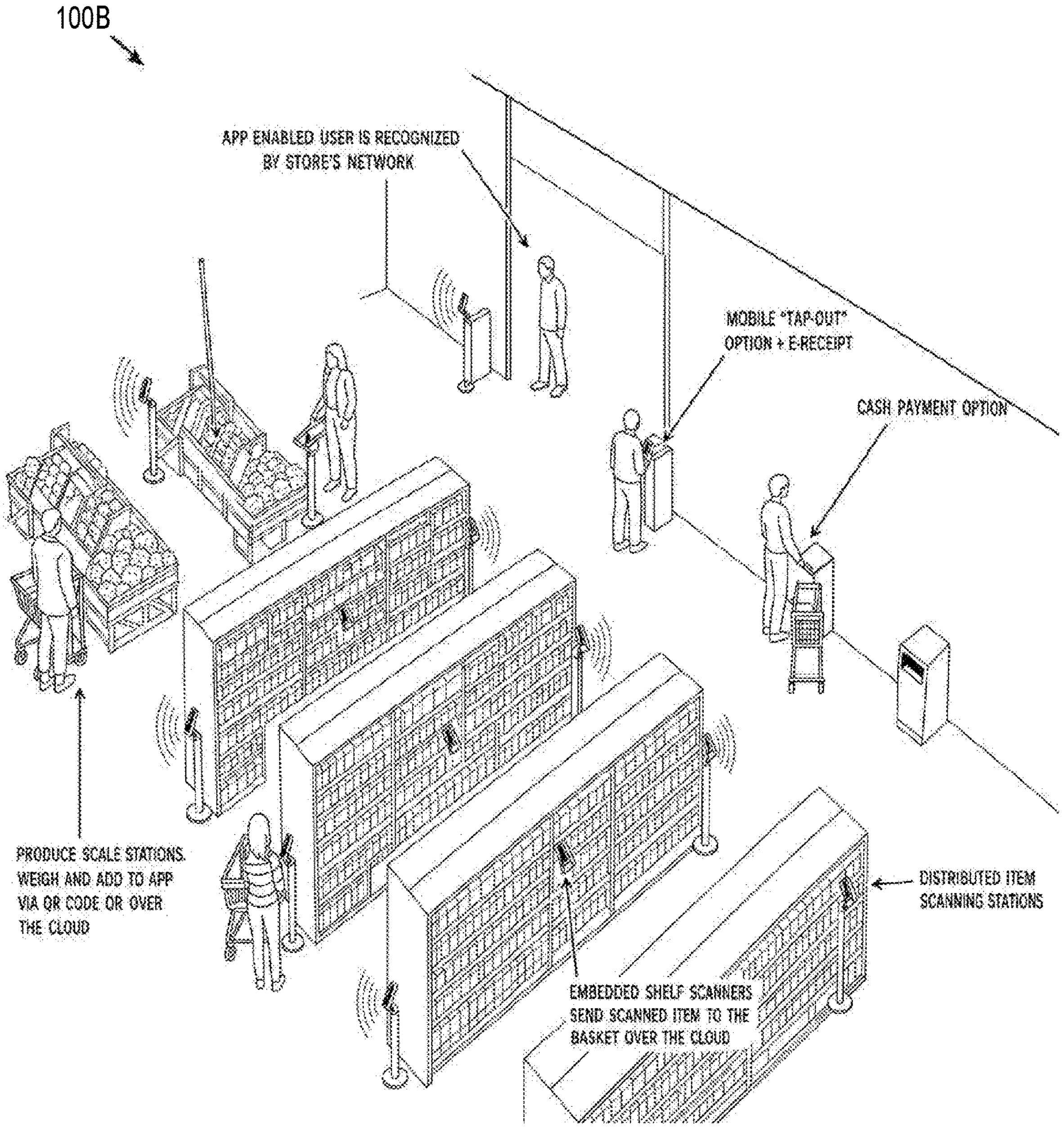
FIG. 1B is a diagram of some example devices distributed throughout a store for decentralized SS checkouts, according to an example embodiment.

In still another case, as illustrated in FIG. 1B below, a wireless beacon detects the wireless transceiver of the shopper's mobile device upon entering the store. This causes the mobile device identifier of the shopper's mobile device to be forwarded to the beacon and relayed to the transaction manager. Transaction manager assigns a transaction/basket identifier for the shopper based on the mobile device identifier and assuming the mobile device identifier is associated with a registered shopper links the transaction/basket identifier to a registered shopper.

Once the shopper is identified as within the store and has an assigned transaction/basket identifier, the locations of the shopper within the store is tracked through the wireless transceiver of the shopper's mobile device and wireless beacons using triangulation between at least two wireless beacons and the shopper's mobile device. Images from one or more cameras can be used to confirm and adjust any triangulated location of the shopper within the store. When the shopper selects an item and approaches a scanner device, the scanner device's wireless transceiver pings the shopper's mobile device and the shopper's mobile app responds with the mobile device's identifier and the assigned transaction/basket identifier for the shopping session. The mobile app may also report the scanner device location to a network-based tracker that tracks the shopper. The tracker uses the beacons and the wireless transceiver of the device to obtain a second location for the shopper. The tracker may also confirm the location via images provided by the cameras. The shopper scans an item at the scanner and the scanner reports the item details to the network-based transaction manager. The transaction manager links the transaction identifier for the shopper to the item details by using the known location for the reporting scanner and the three locations obtained by the tracker from the shopper's mobile device, the triangulation, and the confirming images. The item details are added to the basket of items for the transaction of the shopper and the shopper continues on with their shopping session.

Diagram 100A illustrates Bluetooth® low energy (BLE) beacons used to triangulate current locations of the shopper within the store. It is noted that this is one embodiment and other embodiments can be used as well, such as Wi-Fi signal strengths from transceivers integrated into other distributed devices of the store that are not standalone wireless beacons, near field communication (NFC) beacons, Wi-Fi wireless routers, access points, or extenders situated through the store, etc.

FIG. 1B is a diagram 100B of some example devices distributed throughout a store for decentralized SS checkouts, according to an example embodiment. Diagram 100B illustrates different types of payment devices. For example, a headless stand-alone media acceptor and dispenser is labeled as "Cash Payment Option;" a tap and pay option with a printed receipt is labeled as "Mobile Tap-Out Option+ E-Receipt," although not shown a chip card reader or magnetic strip card reader may also be provided.

Scanners are distributed throughout the store in diagram 100B. Some scanners can be mounted to shelves, such as the triangles illustrated on the shelves in diagram 100B. Some scanners can be mounted on pedestals with a display at the end of the aisles and in front of produce displays. Moreover, the produce display scanners can include a vertical weigh scale from which a bag of produce can be weighed when placed over a protruding hook at the base of the scanner.

Diagram 1008 also illustrated beacon detection of the shopper's mobile device upon entering the store. This triggers a link between the mobile device's identifier and a transaction manager's assigned transaction/basket identifier for a shopping session between the transaction manager of the store and the shopper.

Figure 1C:
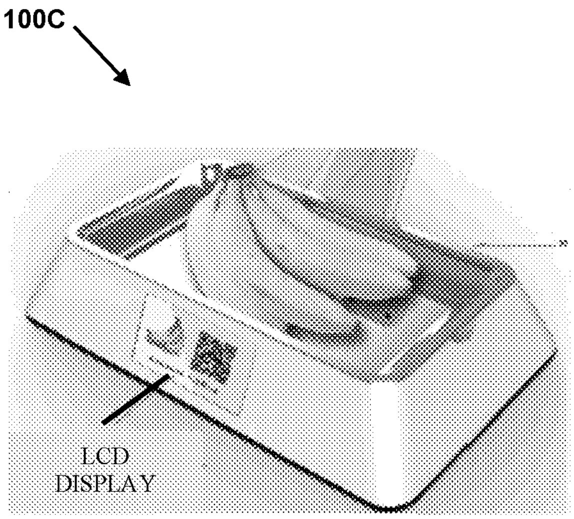
FIGS. 1C, 1D, 1E, and 1F are example distributed devices for decentralized SS checkouts, according to an example embodiment.

FIG. 1C, shown in diagrams 100C, is a distributed weigh scale, according to an example embodiment. A shopper places bananas on the weigh scale. The weigh scale may include a barcode scanner or a camera that performs item identification to identify the bananas and to generate a Quick Response (QR) code with the item code for the bananas and the recorded weight of the bananas.

In an embodiment, the shopper operates the mobile device to scan the QR code, which is then reported by the mobile app to the transaction manager. Transaction manager decodes the QR code to obtain the banana item code and the recorded weight. Optionally, the QR code includes a scanner identifier for the scanner.

In an embodiment, the scanner reports the item code for the bananas and the item weight directly to the transaction manager. The transaction manager links a current tracked location of the shopper to a known location of the scanner and adds the item code and item weight to the shopper's basket of items or transaction. In this embodiment, the scanner does not have to have any LCD display as is depicted in FIG. 1C although the display may still be present to present the item weight and price of the bananas to the shopper for informational purposes.

Figure 1D:

FIG. 1D, shown in diagrams 100C, is a distributed combined scanner and scale device mounted on a pedestal, according to an example embodiment. The hook is designed to hold bags for purposes of recording item weights. The bottom of the display includes a camera or scanner for scanning item barcodes. The display permits item code lookup by the shopper through a lookup interface associated with the combined scanner and scale.

Figure 1E:
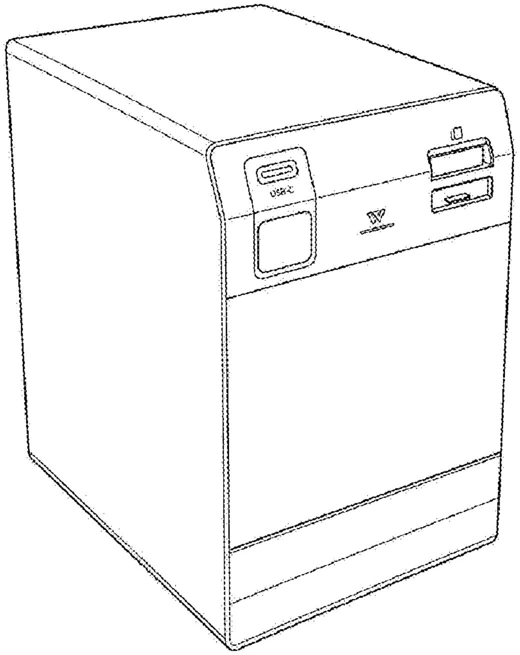

FIG. 1E, shown in diagrams 100C, is a headless distributed payment device, according to an example embodiment. The payment device can be a media accepter and dispenser with a card reader. The card reader can be wireless through card tapping, a chip card reader, and/or a magnetic strip card reader.

Figure 1F:
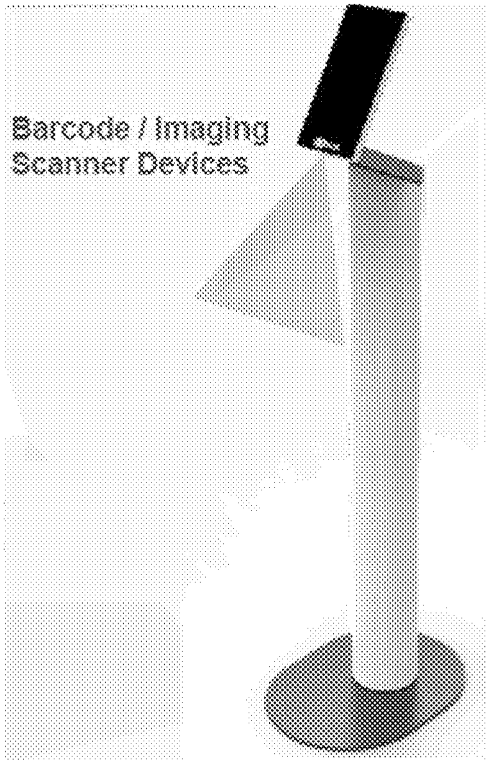

FIG. 1F, shown in diagrams 100C, is a standalone distributed scanner device with a display mounted on a pedestal, according to an example embodiment. The display permits informational feedback to the shopper when an item is scanned, such as item details and item pricing. The display may also provide an item lookup interface to the shopper.

Figure 2:
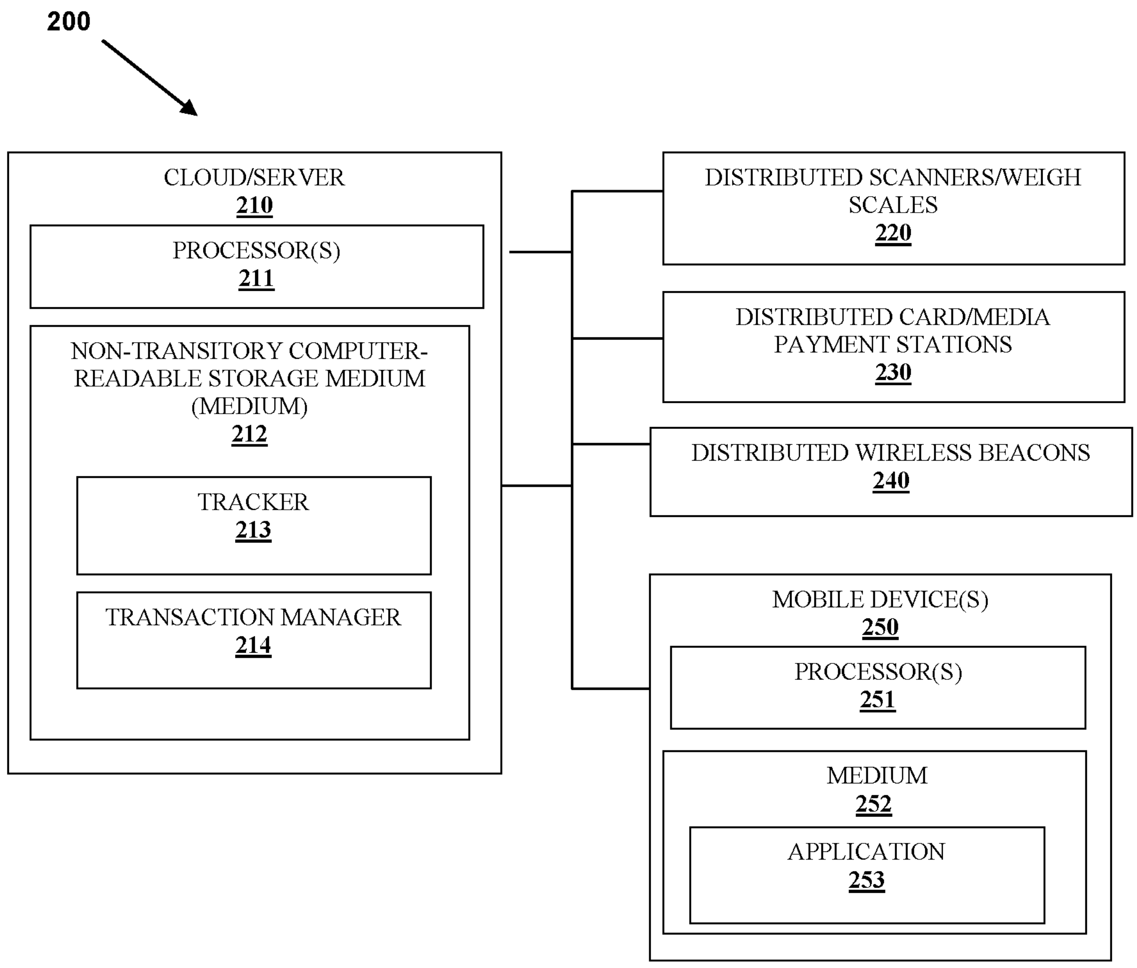
FIG. 2 is a diagram of a system for decentralized SS checkouts, according to an example embodiment.

FIG. 2 is a diagram 200 of a system for SS checkouts, according to an example embodiment. The system 200 includes a cloud 210 or a server 210 (herein after just "cloud 210"), distributed scanners/weigh scales 220, distributed card/media payment stations 230, distributed wireless beacons 240, and one or more mobile devices 250.

Cloud 210 includes one or more processors 211 and a non-transitory computer-readable storage medium (herein after just "medium") 212. Medium 212 includes executable instructions for a tracker 213 and a transaction manager 214, which when provided to the processor 211 cause processor 211 to perform operations discussed herein and below with respect to 213 and 214.

Distributed scanners/weigh scales 220 include standalone distributed scanners, standalone distributed weigh scales, and/or standalone combined scanners and scales. Example scanners and weigh scales 220 were shown in FIGS. 1B, 1C, 1D, and 1E. The scanners/weight scales 220 can include displays and item lookup interfaces.

Distributed card/media payment stations 230 include cash-based or media-based accepters and dispensers, wireless card readers, chip card readers, and/or magnetic strip card readers. Some example card/media payment stations 230 were shown in FIGS. 1B and 1E.

Distributed wireless beacons 250 include standalone beacons and/or wireless transceivers integrated into other wireless devices and/or distributed devices. Some example standalone BLE beacons were shown in FIGS. 1A and 1B. In an embodiment, the beacons 250 are BLE beacons, wireless routers, wireless access points, wireless extenders, NFC beacons, and/or wireless transceivers integrated into the distributed devices discussed above, such as the scanners, the weigh scales, the payment devices, the combined scanner and scale devices, etc.

Each mobile device 250 includes at least one processor 251 and a medium 252. Medium 252 includes executable instructions for a mobile app (hereinafter just "app") 253, which when provided to processor 251 cause processor 251 to perform operations discussed herein and below with respect to 253.

During operation of system 100, a shopper with mobile device 240 enters a store associated with distributed devices 220-240. The shopper can be registered or unregistered and is checked in upon entering the store. This can be done via a beacon 240, by QR code scan, by app location reporting by app 153, or by any of the techniques discussed above with FIG. 1A.

Transaction manager 214 receives the device identifier reported upon checking for device 250 and generates a transaction/basket identifier that is linked to the device identifier. In an embodiment, the device identifier is further linked to a registered shopper with an account with the store.

Tracker 213 begins tracking the location of the shopper within the store using a variety of techniques, such as triangulation between the wireless transceiver of device 250 and at least two wireless beacons 240, at least two wireless transceivers associated with devices 230 and/or 220, or at least two wireless transceivers associated with any combination of beacons 240, devices 230, devices 220, wireless routers, wireless access points, and/or wireless extenders. Camera images provided by cameras of the store may be imaged processed to confirm any triangulated location of the shopper.

The shopper begins the shopping session by picking an item from a shelf, freezer, or produce display. The shopper goes to a nearest scanner/weigh scale 220 while the shopper's location is being reported in real time by tracker 213 to manager 214. The distributed device 220 reports the item details and item weight after scanning an item bar code and/or weighing the item to manager 214. The reporting device 220 is associated with a known location such that manager 214 uses the current location of the shopper to link the shopper to the device 220. The item details are recorded in the basket of items or transaction under the transaction/basket identifier for the shopping session.

Manager 214 also reports the item details to app 253 to keep the basket of items maintained by manager 214 for the shopper in synchronization with the app 253. In this way, should the shopper want to view the current transaction as it proceeds, the shopper views the user interface of app 253 on device 250. It is noted that the shopper does not have to operate app 253 during the shopping session.

The shopper selects a next item and visits a nearest device 220 to record that item for the transaction. Manager 214 updates the transaction details and updates app 253 accordingly. This continues until the shopper is ready to exit the store and end the shopping session.

A registered shopper with a registered payment account can exit the store without looking at app 253 and manager 214 will process the transaction payment due using the registered payment account. A registered shopper can also view app 253 and be asked to confirm that the shopper wants to pay the amount shown in the user interface, upon receiving a confirmation, the shopper exits the store and manager 214 processes the payment using the registered payment account.

A registered or unregistered shopper can exit the store after first visiting a payment station 230. Here, the shopper views app 253 to see the amount that is due for the transaction. The shopper provides cash or a payment card to station 230. Station 230 reports the payment details or cash received to manager 214. Manager 214 links the transaction identifier for the shopper's transaction to a known location for station 230 and processes the payment. When cash is received and change is due to the shopper, manager 214 instructs the station 230 to dispense the correct amount of change to the shopper. For a registered shopper, manager 214 sends an electronic transaction receipt for the completed transaction to a contract address associated with the shopper or via text message. An unregistered shopper receives a text message receipt using the device identifier for device 250.

In an embodiment, when a shopper is attempting to purchase a restricted item or merely wants authorization during the shopping session to purchase restricted items (for example, items requiring age verification for alcohol, tobacco, etc.), this can be processed by transaction manager 214 and tracker 213 in combination with distributed devices 220-240 in a variety of manners. When personal verification is needed, an attendant is dispatched by transaction manager 214 upon scanning of a restricted item to the corresponding device 220-240. The attendant verifies an identification card of the customer and provides an authorization code to manager 214. Tracker 213 and manager 214 maintain the authorization with the shopper and the transaction identifier for the basket of items, such that the shopper can subsequently scan another restricted item without requiring a second in-person attendant to provide authorization. When personal verification is not needed, the displays and cameras of devices 220-240 can include a user interface activated when a restricted item is scanned that request the shopper present an identification card for image capture. The image of the identification can be sent to an attendant device for authorization or image processed for automated authorization. Again, tracker 213 and manager 214 maintain the authorization during the entire shopping session such that subsequent scans of restricted items do not require the shopper to present their identification card for authorization.

In an embodiment, tracker 213 and transaction manager 214 maintains metrics for each shopping session of the store stored in a log. The logs can be aggregated and mined for providing useful information to the store, such as a most traveled path of shoppers through the store, types of customers shopping (for example, groups, families, single customers, etc.), most frequently scanned items by age groups of the shoppers, highest concentrated locations of shoppers within the store, distributed device associated with the most or least scanned items, locations within the store with a most or a least amount of shopper traffic, inventory tracking, associate training, etc.

Figure 3A:
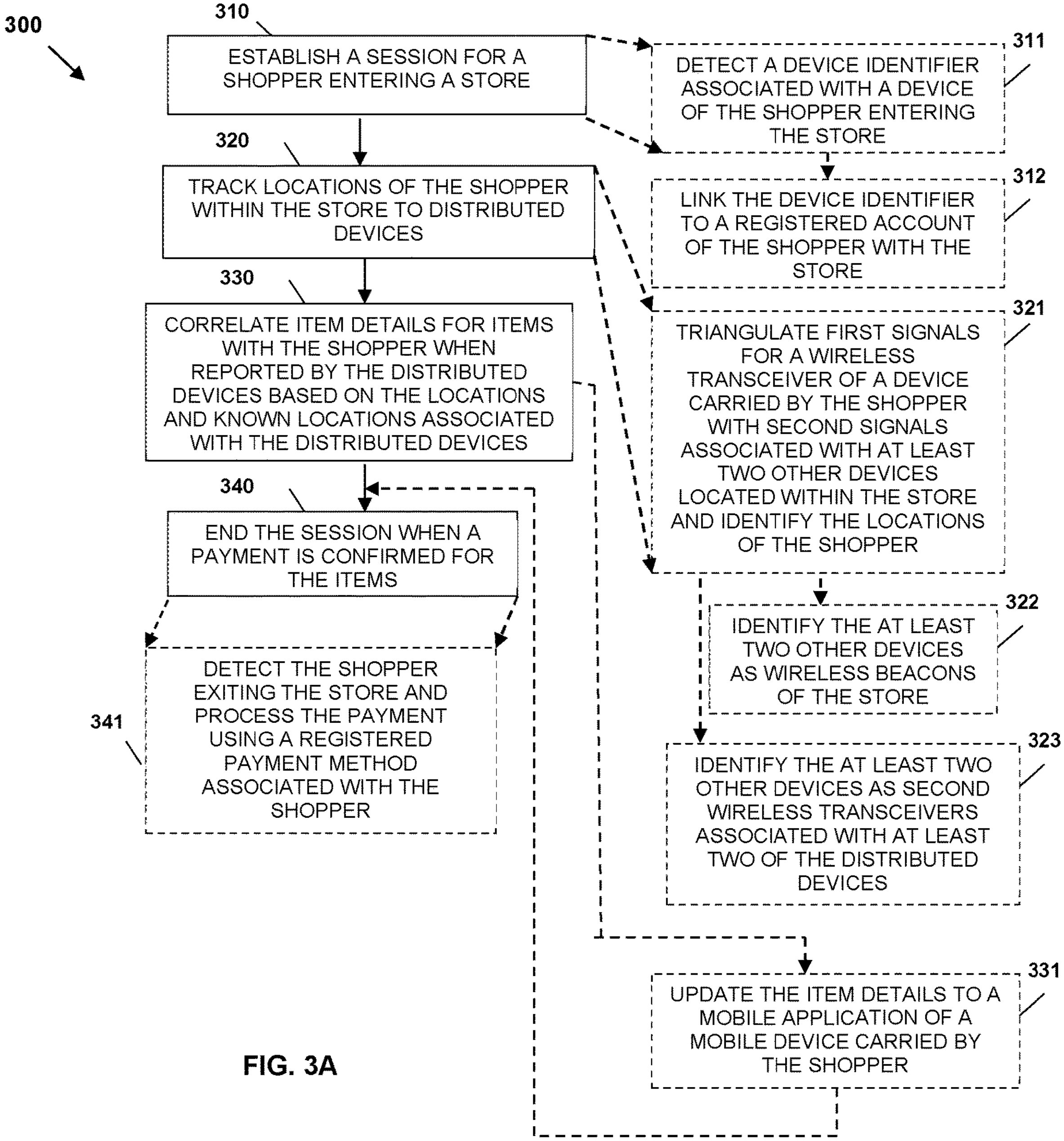
FIG. 3A is a flow diagram of a method for decentralized SS checkouts, according to an example embodiment.
Figure 3B:
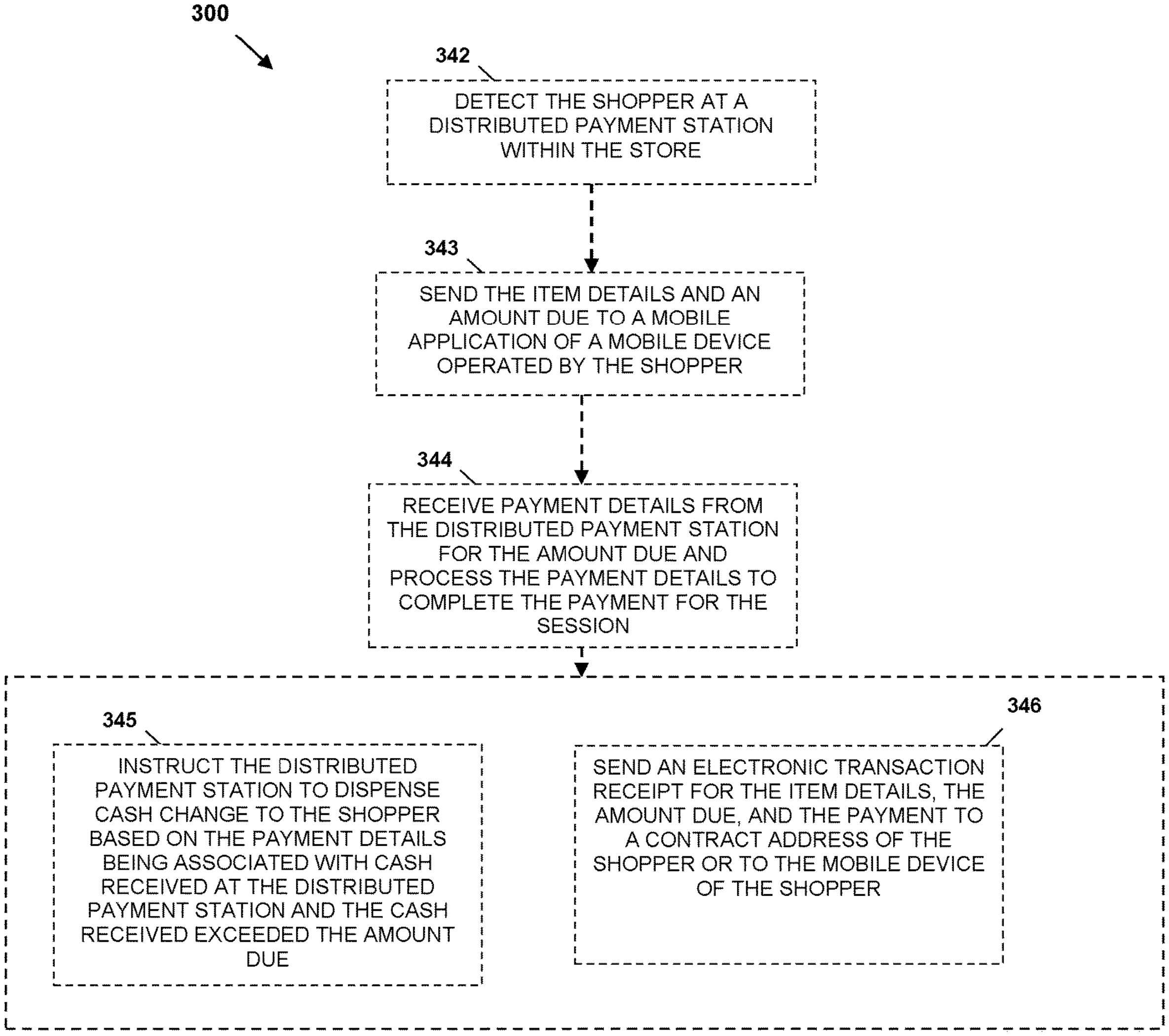
FIG. 3B is a flow diagram of embodiments of FIG. 3A, according to an embodiment.
Figure 4:
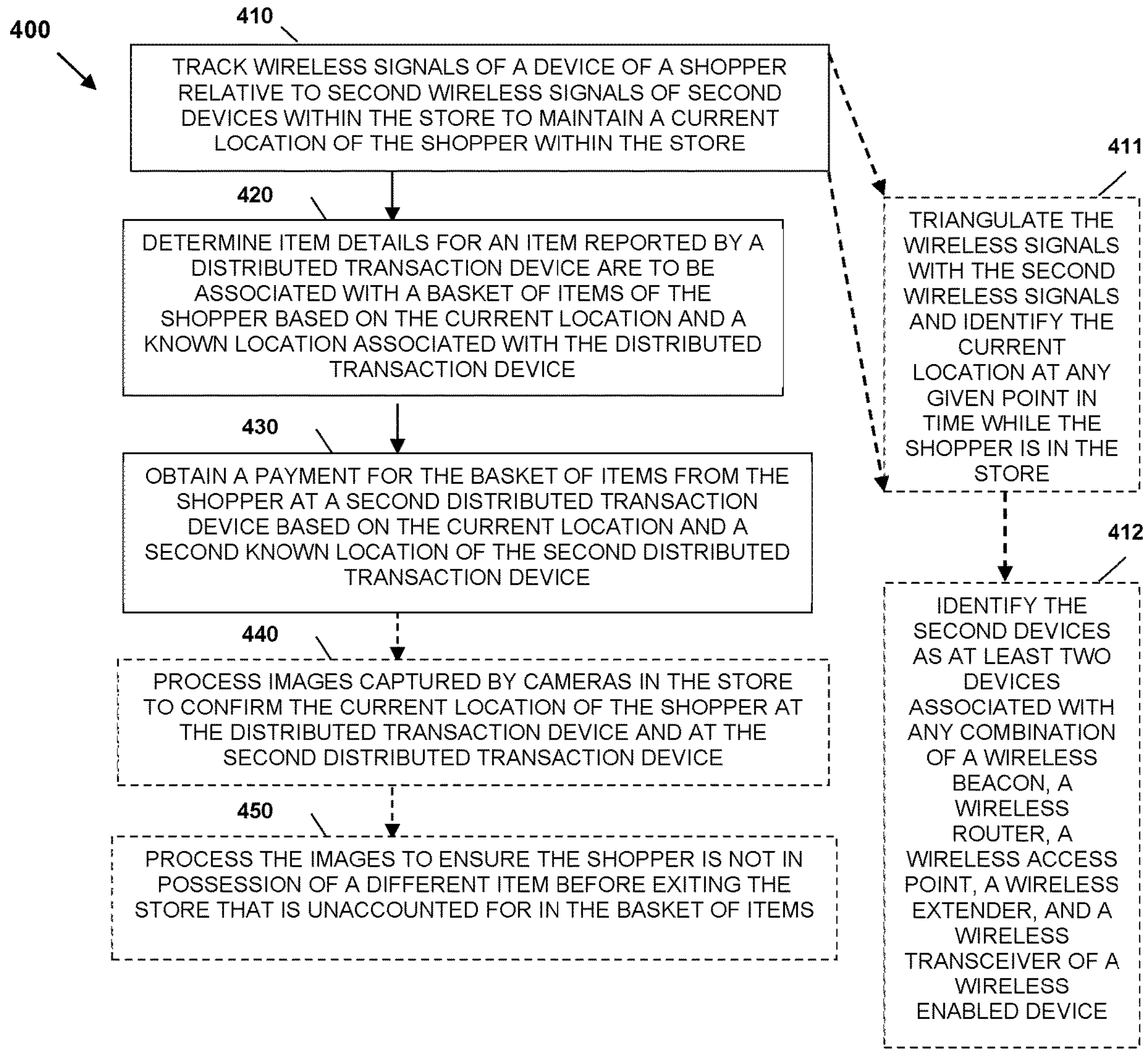
FIG. 4 is another flow diagram of a method for decentralized SS checkouts, according to an example embodiment.

The above-noted embodiments and other embodiments are now discussed further with reference to FIGS. 3 and 4. FIGS. 3A and 3B are flow diagrams a method 300 for distributed SS checkouts, according to an example embodiment. The software module(s) that implements the method 300 is referred to as a "distributed transaction manager." The distributed transaction manager is implemented as executable instructions programmed and residing within memory and/or a non-transitory computer-readable (processor-readable) storage medium and executed by one or more processors of a device or set of devices. The processor(s) of the device that executes the distributed transaction manager are specifically configured and programmed to process the distributed transaction manager. The computer-vision item transaction manager has access to one or more network connections during its processing. The network connections can be wired, wireless, or a combination of wired and wireless.

In an embodiment, the device that executes distributed transaction manager is cloud 210. In an embodiment, the device that executes the distributed transaction manager is server 210.

In an embodiment, the distributed transaction manager is all of, or some combination of, 213 and/or 214. The distributed transaction manager presents another and, in some ways, an enhanced processing perspective from that which was described above for the FIGS. 1A-1F and 2.

At 310 (shown in FIG. 3A), the distributed transaction manager establishes a session for a shopper entering a store. This can be done in a variety of manners as was discussed above.

For example, and in an embodiment at 311 (shown in FIG. 3A), the distributed transaction manager detects a device identifier associated with a device of the shopper entering the store. This can be done through a wireless beacon or through interaction with a mobile app of a mobile device of the shopper. In an embodiment of 311 and at 312 (shown in FIG. 3A), the distributed transaction manager links the device identifier to a registered account of the shopper with the store.

At 320 (shown in FIG. 3A), the distributed transaction manager tracks location of the shopper within the store to distributed devices. That is, the shopper's location within the store is tracked to specific locations with accuracy of a few feet.

In an embodiment, at 321 (shown in FIG. 3A), the distributed transaction manager triangulates first signals for a wireless transceiver of a device carried by the shopper with second signals associated with at least two other devices located within the store. The distributed transaction manager identifies the locations of the shopper within the store based on the triangulation. In an embodiment of 321 and at 322 (shown in FIG. 3A), the distributed transaction manager identifies the at least two other devices as wireless beacons of the store and situated throughout the store. In an embodiment of 321 and at 323 (shown in FIG. 3A), the distributed transaction manager identifies the at least two other devices as second wireless transceivers associated with at least two other distributed devices located within the store.

At 330 (shown in FIG. 3A), the distributed transaction manager correlates item details for items with the shopper when reported by the distributed devices based on the locations of the shopper and known locations associated with the distributed devices. In an embodiment, the locations of the shopper are confirmed through image processing of images provided by cameras in the store.

In an embodiment, at 331 (shown in FIG. 3A), the distributed transaction manager updates item details to a mobile application of a mobile device carried by the shopper. The shopper need not be actively operating the mobile device; the distributed transaction manager keeps the item details updated and in synchronization with the mobile application such that at any point in time the shopper can view the user interface of the application and identify the item details for the session.

At 340 (shown in FIG. 3A), the distributed transaction manager ends the session when a payment is confirmed for the items. This can be done in a variety of manners.

For example and in an embodiment, at 341 (shown in FIG. 3A), the distributed transaction manager detects the shopper exiting the store and processes a payment using a registered payment method associated with the shopper. Here, the shopper is a registered shopper that has provided the registered payment method with an account of the shopper.

In an embodiment, at 342 (shown in FIG. 3B), the distributed transaction manager detect the shopper at a distributed payment station within the store. In an embodiment of 342 and at 343 (shown in FIG. 3B), the distributed transaction manager sends the item details and an amount due to a mobile application of a mobile device operated by the shopper. This allows the shopper to view the item details for the transaction or the shopper's current basket of items. In an embodiment of 343 and at 344 (shown in FIG. 3B), the distributed transaction manager receives payment details from the distributed payment station for the amount due and processes the payment details to complete the payment for the session.

In an embodiment of 344 and at 345 (shown in FIG. 3B), the distributed transaction manager instructs the distributed payment station to dispense cash change to the shopper based on the payment details being associated with cash received at the distributed payment station and the cash received exceeded the amount due. In an embodiment of 344 and at 346 (shown in FIG. 3B), the distributed transaction manager sends an electronic transaction receipt for the item details, the amount due, and the payment to a contract address of the shopper or to a mobile device of the shopper.

FIG. 4 is a flow diagram of another method 400 for distributed SS checkouts, according to an example embodiment. The software module(s) that implements the method 300 is referred to as a "transaction tracker and manager." The transaction tracker and manager is implemented as executable instructions programmed and residing within memory and/or a non-transitory computer-readable (processor-readable) storage medium and executed by one or more processors of a device or set of devices. The processor(s) of the device that executes the transaction tracker and manager are specifically configured and programmed to process the transaction tracker and manager. The transaction tracker and manager has access to one or more network connections during its processing. The network connections can be wired, wireless, or a combination of wired and wireless.

In an embodiment, the device that executes transaction tracker and manager is cloud 210. In an embodiment, the device that executes the transaction tracker and manager is server 210.

In an embodiment, the transaction tracker and manager is all of, or some combination of, 213, 214, and/or method 200. The transaction tracker and manager presents another and, in some ways, an enhanced processing perspective from that which was described above for the FIGS. 1A-1F, 2, and 3.

At 410, the transaction tracker and manager tracks wireless signals of a device of a shopper relative to second wireless signals of second devices within the store. Based on the tracking, the transaction tracker and manager maintains a current location of the shopper within the store at any given point in time while the shopper is in the store.

In an embodiment, at 411, the transaction tracker and manager triangulates the wireless signals with the second wireless signals and identifies the current location at any given point in time. In an embodiment of 411 and at 412, the transaction tracker and manager identifies the second devices as at least two devices associated with any combination of a wireless beacon, a wireless router, a wireless access point, a wireless extender, and a wireless transceiver of a wireless enabled device.

At 420, the transaction tracker and manager determines item details for an item reported by a distributed transaction device are to be associated with a basket of items of the shopper based on the current location of the shopper and a known location associated with the distributed transaction device. This is an indication that the shopper scanned an item or weighed an item within the store at one of the distributed transaction devices.

At 430, the transaction tracker and manager obtains a payment for the basket of items from the shopper at a second distributed transaction device based on the current location and a second known location for the second distributed transaction device. This is an indication that the shopper has concluded the transaction with the store and is about to exit the store.

In an embodiment, at 440, the transaction tracker and manager processes images captured by cameras in the store to confirm the current location of the shopper at the distributed transaction device and at the second distributed transaction device. In an embodiment of 440 and at 450, the transaction tracker and manager further processes the images to ensure the shopper is not in possession of a different item before exiting the store that is unaccounted for in the basket of items. This permits image processing to focus on security.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

tracking a current location of a shopper within a store by comparing first wireless signals of a device of the shopper to second wireless signals of devices within the store;

reporting, in real time, the current location of the shopper to a cloud-based transaction manager or a server-based transaction manager;

pinging, by a first distributed transaction device, the device of the shopper to receive a device identifier and an assigned transaction identifier for a shopping session of the shopper before the first distributed transaction device reports item information for an item;

determining that item information for an item reported by a first distributed transaction device is to be associated with a basket of items of the shopper based on the current location of the shopper and a first known location associated with the first distributed transaction device;

synchronizing the basket of items and corresponding item details with a mobile application of the device of the shopper;

obtaining a payment for the basket of items from the shopper at a second distributed transaction device based on the current location of the shopper and a second known location associated with the second distributed transaction device; and maintaining a transaction log associated with the shopper, the transaction log including metrics indicative of a path of the shopper through the store and types of items scanned by the shopper;

wherein the first distributed transaction device and the second distributed transaction device networked together via a communicative coupling to a network server or a cloud, and are modular and reconfigurable within the store.

2. The method of claim 1 further comprising:

processing images captured by cameras in the store to confirm the current location of the shopper at the first distributed transaction device and at the second distributed transaction device.

3. The method of claim 2 further comprising processing the images to ensure the shopper is not in possession of a different item before exiting the store that is unaccounted for in the basket of items.

4. The method of claim 1, wherein tracking further includes triangulating the first wireless signals with the second wireless signals and identifying the current location of the shopper at any given point in time while the shopper is in the store.

5. The method of claim 1, wherein triangulating further includes identifying the devices as at least two devices associated with any combination of a wireless beacon, a wireless router, a wireless access point, a wireless extender, and a wireless transceiver of wireless enabled device.

6. A system, comprising:

a distributed transaction scanner;

a distributed transaction scale;

a distributed payment station;

wireless beacons; and a server, comprising:

a processor and a non-transitory computer-readable storage medium; and the non-transitory computer-readable storage medium comprising executable instructions that when executed by the processor cause the processor to perform operations comprising:

detecting a device of a shopper entering a store using at least one of the wireless beacons;

generating a transaction identifier for a transaction associated with the shopper within the store;

linking the transaction identifier to a device identifier associated with the device of the shopper;

triangulating wireless signals of the device with second wireless signals of the wireless beacons to maintain a current location of the shopper within the store;

reporting, in real time, the current location to the server;

transmitting, by the distributed transaction scanner, a ping to the device of the shopper to receive the device identifier and the transaction identifier from the device of the shopper before the distributed transaction scanner reports item information to the server;

adding first item codes that were scanned by the distributed transaction scanner and that were associated with first items to the transaction based on the current location of the shopper and a known location of the distributed transaction scanner;

adding second item codes and item weights that were weighed by the distributed transaction scale and that are associated with second items to the transaction based on the current location of the shopper and a second known location of the distributed transaction scale;

synchronizing updated item details for the transaction with a mobile application of the device of the shopper;

processing, by the distributed payment station, a payment for the transaction on the current location of the shopper and a third known location of the distributed payment station; and maintaining a transaction log associated with the shopper, the transaction log including the metrics indicative of a path of the shopper through the store and types of items scanned or weighed by the shopper;

wherein the distributed transaction scanner, distributed transaction scale, and distributed payment station are networked together via a communicative coupling to the server and are modular and reconfigurable within the store and are networked together via a communicative coupling to the server.

7. The system of claim 6 further comprising:

at least one camera;

wherein the operations further comprise:

processing images received from the at least one camera to verify the current location of the shopper at any point in time while the shopper is in the store; and further processing the images to identify whether a different item that is not associated with the transaction is in possession of the shopper before the shopper exits the store.

8. The system of claim 6, wherein the operations further comprise linking the device identifier to a registered account of the shopper with the store.

9. The system of claim 6, wherein processing the payment comprises:

detecting the shopper exiting the store; and processing, by the distributed payment station, the payment for the transaction using a registered payment method associated with a registered account of the shopper.

10. The system of claim 6, wherein generating the transaction identifier comprises sending the transaction identifier to the mobile application of the device of the shopper.

11. The system of claim 6, wherein processing the payment comprises:

receiving payment details from the distributed payment station indicating cash received at the distributed payment station that exceeded an amount due for the transaction; and instructing the distributed payment station to dispense cash change to the shopper based on the cash received exceeding the amount due.

12. The system of claim 6, wherein the operations comprise:

image processing images from at least one camera in the store to confirm any triangulated location of the shopper.

* * * * *